June 17, 1952     O. D. GRANDSTAFF     2,600,639
VOLTAGE REGULATING SYSTEM
Filed Sept. 6, 1949
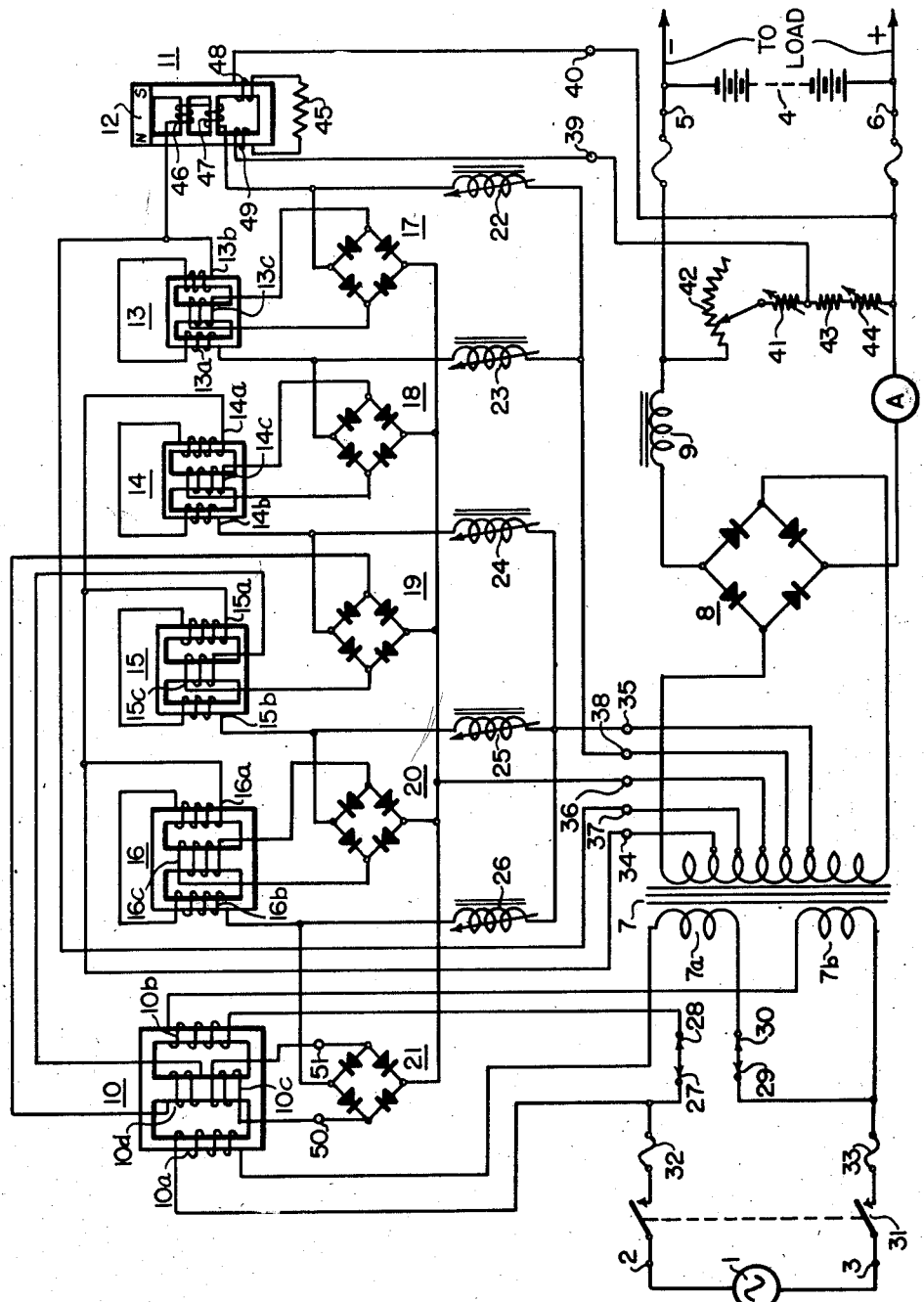
*INVENTOR.*
OTHO D. GRANDSTAFF
BY
ATTORNEY Patented June 17, 1952

2,600,639

UNITED STATES PATENT OFFICE 2,600,639

VOLTAGE REGULATING SYSTEM

Otho D. Grandstaff, Oak Park, Ill., assignor to Automatic Electric Laboratories, Inc., Chicago, Ill., a corporation of Delaware Application September 6, 1949, Serial No. 114,116

11 Claims. (Cl. 321—18)

This invention relates in general to voltage regulation systems, and in particular to improved apparatus and circuit arrangements for regulating the output voltage of battery chargers or battery eliminators.

Heretofore, in a regulating system of this type, the load current would overshoot a desired value in seeking regulation. At various instances in operation, the load current would vary at great values causing an oscillatory condition before reaching the desired operating point. This activity causes commercial difficulties. The present invention overcomes this problem and suppresses the oscillatory condition of the load current to afford greater commercial and operating advantages to the present system.

An object of this invention is to provide a voltage regulation system in which the load current oscillations are suppressed to improve stability.

Another object of the invention is to provide an improved form of saturable reactance amplifier, for use in a voltage regulating system, in which a higher degree of amplification is obtained than in previously proposed reactance amplifiers through the use of a novel degenerative feedback winding.

The above objects will be more fully appreciated upon a further perusal of specification taken in conjunction with the accompanying drawing which illustrates a preferred embodiment of the invention in the form of a schematic circuit diagram.

Described briefly, the invention comprises a conventional battery charger modified by the connection of a saturable reactor in the input circuit thereof; a standard of comparison comprising a magnetic structure including a permanent magnet and an electromagnet which is connected across the output circuit of the charger so as to produce a magneto-motive force, which is proportional to the output voltage in said magnetic structure; and a magnetic or saturable reactance amplifier having its input circuit connected to a further winding on said magnetic structure, so as to be governed in accordance with the difference in the magneto-motive forces of said permanent magnet and said electromagnet, and having the output circuit of the electromagnet connected to the saturating winding on said first reactor; whereby the impedance of said first reactor is varied so as to maintain the output voltage substantially constant regardless of variations in input voltage, load current, aging of the rectifiers, etc.

The present invention is a direct improvement on United States Patent No. 2,560,284, issued July 10, 1951 by the present inventor. In addition thereto, a negative feedback voltage is obtained from an extra winding on the center leg of the last saturable reactor core along with the D. C. saturating winding. The feedback voltage is applied to a previous stage of the magnetic amplifier by connecting the extra winding in series with a D. C. saturating winding and the rectifier from which the latter winding is energized. The extra winding is arranged so that its polarity is such that any momentary increase of D. C. flux in the last reactor will cause a reduction of D. C. ampere-turns on the reactor of a previous stage and likewise the converse is true. The negative feedback winding when applied to the magnetic amplifiers, as shown, affords a means of suppressing oscillation in the load current.

Another practical result of this feedback circuit is that it improves the gain of the magnetic amplifier even though it is connected as a negative feedback circuit to suppress oscillations. At no load the A. C. flux of the saturable reactor links the two A. C. windings only, but as a D. C. saturation is increased, a portion of the A. C. flux links the windings on the center leg. Thereby the A. C. flux increases with saturation. This A. C. flux induces a voltage in the extra winding at a frequency which is double the frequency of the A. C. source and the magnitude of the voltage of the extra winding is increasing with D. C. saturation. The induced A. C. voltage of the extra winding is half wave rectified by the rectifier of the earlier stage to which it is connected, and regardless of the negative feedback arrangement of the winding, the rectifier will allow additional current to flow only in the same direction as the original saturating current in that stage. Thus, the extra rectified current adds to the original rectified current resulting in increased saturation for the preceding reactor stage.

Referring now to the drawing, there is shown a source of alternating current 1 connected to the input terminals 2 and 3 of the charger, and a battery 4 connected in multiple with a load circuit to the output terminals 5 and 6. Between the input and output terminals there is shown a conventional charger comprising a transformer 7, a full wave dry-disc type rectifier 8, and a filter reactor 9. A regulating reactor 10 is connected in series with the primary windings of transformer 7 and the alternating current source 1. A portion of the output voltage of the charger is applied to windings on a control device 11 which compares the magneto-motive force produced by these windings with that of a permanent magnet 12 and governs the impedance of further windings thereon in accordance with the difference in the two magneto-motive forces. The impedance of these further windings governs the voltage applied to the input of a saturable reactance amplifier comprising saturable reactors 13 through 16, full wave dry-disc rectifiers 17 through 21, and reactors 23 through 26. The output circuit of the magnetic amplifier is connected to the saturating winding 10c on the regulating reactor 10. A winding 10d is wound around the center core of regulating reactor 10 in addition to the D. C. saturating winding 10c. D. C. saturating winding 15c and rectifier 19 are connected in series with winding 10d so that any momentary increase of D. C. flux in the reactor will cause a reduction of D. C. ampere-turns in the reactor 15.

The charger is arranged for use on either 115 v. A. C. or 230 v. A. C. by simply changing the strapping of terminals 27 through 30. These terminals are shown for 115 volt operation, in which case terminal 2 is connected through one contact of switch 31, fuse 32, windings 10a and 7a, the strap between terminals 29 and 30, fuse 33, and another contact of switch 31 to terminal 3. Windings 10b and 7b are connected in multiple with windings 10a and 7a through the strap connected between terminals 27 and 28. For 230 volt operation, the straps shown are removed and terminals 28 and 30 are strapped, in which case windings 10a, 7a, 10b and 7b are connected in series across the supply circuit. The winding directions on the regulating reactor 10, and on the saturable reactors 13 through 16, are such that the magnetic fluxes are produced in the core by the two windings on the outer legs. The impedance of the windings on the outer legs of each of these reactor cores varies with the degree of saturation of the core, which is controlled by the amount of direct current flowing in the winding 10c on the center leg.

The control device 11 is also a saturable reactor, but differs in construction and operation from the other saturable reactors 10 and 13 through 16. The control device comprises a magnetic core having four legs joined by two yokes in which the two inner legs are restricted in cross section to permit ready saturation thereof. One of the outer legs of the core comprises a permanent magnet 12. Winding 46 is provided on one of the inner legs, and winding 47 on the other. These windings, hereinafter termed A. C. windings, are connected in series so that the magnetic flux produced by current flowing in the series circuit flows in opposite directions in the two inner legs of the core; whereby these windings are incapable of producing a difference in magneto-motive force between the two yokes and thus will not produce a demagnetizing effect on the permanent magnet when energized with alternating current. Two additional windings 48 and 49, hereinafter termed D. C. windings, are provided; one on each yoke between the remaining outer leg and the inner legs. These windings are connected in series aiding relation and may, if desired, be replaced by a single winding on said remaining outer leg. A resistor 45, which has a negative temperature coefficient, is connected in series with the aforesaid D. C. windings to compensate for the variation in resistance thereof with changes in temperature. This resistor is preferably imbedded in the core of the control device 11. Alternatively, the D. C. winding may be wound with wire having a low temperature coefficient.

When the D. C. windings 48 and 49 of the control device 11 are energized by connecting a source of direct current across terminals 39 and 40, with the positive terminal of the source connected to terminal 40, the fluxes produced by these windings and by the permanent magnet will be aiding in the outer legs and yokes of the core but will be opposing in the two inner legs. For a predetermined voltage across the D. C. windings, determined by the strength of the permanent magnet, the aforesaid fluxes will cancel each other in the inner legs of the core and consequently the A. C. windings 46 and 47 thereon will have a maximum impedance. If the voltage across the D. C. windings is then either increased or decreased a net flux will be produced in the inner legs in accordance with the difference between the magneto-motive forces of the permanent magnet and the D. C. windings. Due to saturation of the inner legs, the impedance of the A. C. windings will decrease to a minimum value as the voltage across the D. C. windings is gradually increased or decreased from said predetermined value.

The D. C. windings of the control device 11 are bridged across the output terminals 5, 6 of the charger in series with resistors 41 and 42 and in shunt with resistors 43 and 44, whereby the impedance of the A. C. windings of the control device is caused to vary in accordance with the output voltage of the charger. The A. C. windings of the control device are bridged across symmetrically spaced taps on the secondary winding of transformer 7, in series with variable reactor 22, via terminals 37 and 38. The A. C. terminals of bridge rectifier 17 are connected between the midpoint of the secondary winding of transformer 7 and the junction between reactor 22 and the A. C. windings of control device 11. The D. C. terminals of rectifier 17 are connected to the saturating winding 13c of reactor 13. The A. C. windings 13a and 13b are similarly bridged across the aforesaid symmetrically spaced taps on transformer 7 in series with reactor 23. The A. C. terminals of bridge rectifier 18 are connected between the center tap on transformer 7 and the junction between winding 13a and reactor 13. The D. C. terminals of rectifier 18 are connected to the saturating winding 14c of reactor 14. The D. C. terminals of rectifier 19 are connected in series with saturating winding 15c and winding 10d. The A. C. terminals of bridge rectifier 19 are connected between the center tap 36 of transformer 37 and the junction between winding 14b and reactor 24. The D. C. terminals of rectifier 20 are connected to the saturating winding 16c of reactor 16. The A. C. terminals of bridge rectifier 20 are connected between the center tap 36 on transformer 7 and the junction between windings 15b and reactor 25.

A negative feedback voltage is obtained from the winding 10d on the center leg of reactor 10, and is applied to the magnetic amplifier by a series connection with D. C. saturating winding 15c of reactor 15 and rectifier 19. The polarity of winding 10d is such that any momentary increase of D. C. flux in reactor 10 will cause a reduction of D. C. ampere-turns in the winding 15c of reactor 15, and likewise the converse is true. The effect, therefore, is to suppress oscillations in the load current as indicated by ammeter A.

Another practical result of the feedback winding 10d is that it improved the gain of the magnetic amplifier even though it is connected for negative feedback to suppress oscillations of the load current. At no load, the A. C. flux of saturable reactor 10 links the two A. C. windings 10a and 10b only. As the D. C. saturation is increased by coil 10c, a portion of the A. C. flux links the coils 10d and 10c on the center leg of reactor 10, and therefore the magnitude of voltage in winding 10d is increasing with saturation. This A. C. voltage in winding 10d which is double the frequency of the A. C. source and of increasing magnitude with D. C. saturation in coil 10c. This induced A. C. voltage of winding 10d is half-wave rectified by the rectifier 19 to which it is connected. The rectifier 19 will allow additional current to flow only in the same direction as the original saturating current in winding 15a. Thus, the extra rectified current of winding 10d adds to the original rectified current of winding 15c resulting in increased saturation and greater gain for the magnetic amplifier.

The control device 11 and the saturable reactance or magnetic amplifier are preferably constructed as a sub-assembly which may readily be adjusted prior to the final assembly of the complete charging unit. The manner in which the adjustment of this sub-assembly is carried out will now be described in order to facilitate the understanding of the operation thereof. During the adjustment the terminals 34 and 35 are connected to a suitable source of alternating current, the midpoint of the source being connected to terminal 36. Terminals 37 and 38 are also connected to a suitable source of alternating current having its midpoint connected to terminal 36. A transformer having its secondary tapped at ±15 v., ±2.5 v., 0, ∓2.5 v., ∓15 v., for example, may be employed for this purpose. Terminals 39 and 40 are connected to the negative and positive terminals, respectively, of a source of direct current of variable voltage. The voltage between terminals 39 and 40 is initially adjusted to a predetermined value which is less than the minimum calibration point of a dial, not shown, with which the charger is to be used. For example, if the charger is to be used in conjunction with a telephone exchange battery which has a nominal voltage of 48 volts, the voltage between terminals 39 and 40 will be initially adjusted to a voltage between 44–56 volts for the dial, not shown, calibration. A direct current voltmeter is then connected across the saturating winding 13c of reactor 13. The strength of permanent magnet 12, which is initially magnetized to a higher degree than actually required, is now adjusted until a predetermined voltage appears across winding 13c. This may conveniently be accomplished by shifting the magnet 12 partially off of the core of the control device 11 to successively greater distances, and returning the magnet to its initial position between each shift, until the required voltage is obtained with the magnet in its normal position. After the strength of the magnet has thus been adjusted to the desired value it is rigidly secured to the core.

The variable reactors 22 through 26 are initially adjusted to the minimum value of inductance. The inductance of each of these reactors will then be less than that of the A. C. windings, such as 13a and 13b, of the corresponding saturable reactors. The inductance of reactor 22 is gradually increased. As the inductance of this reactor approaches that of the A. C. windings on the control device 11, the voltage across winding 13c will decrease to a minimum value, and will then increase as the inductance of reactor 22 is further increased. The balance point is not sharply defined and it is therefore desirable to increase the inductance of reactor 22 until the voltage across winding 13c just starts to increase in order to obtain the maximum sensitivity. The voltmeter is then transferred to winding 14c and reactor 23 is adjusted in like manner after which reactors 24, 25 and 26 are similarly adjusted. Since reactor 10 is not included in the sub-assembly a resistor may be connected across terminals 50 and 51 to replace winding 10c during the adjustment of the sub-assembly and the leads to winding 10d are shorted.

After the sub-assembly has been adjusted as described in the preceding paragraph it is assembled with and connected to the other elements of the complete charging unit as illustrated. The fraction of the output voltage which is impressed on the D. C. windings of the control device 11 is determined by the values of resistors 41 through 44. Resistor 42 is calibrated in terms of output voltage to permit ready field adjustment of the charger to any desired output voltage within the working range of the charger, which may be 44 to 56 volts, for example. Resistors 41 and 44 are made adjustable to obtain correspondence between the calibration of resistor 42 and the output voltage. With resistor 42 set to the nominal value of output voltage indicated on its calibrated scale, resistors 41 and 44 are adjusted until the output current is approximately two-thirds the rated capacity of the charger.

Tests have shown that the output voltage will be maintained within ±2% of the desired nominal value, which is determined by the setting of resistor 42, for all loads within the capacity of the charger despite ±10% variations in input voltage, ±10% variations in frequency, or ageing of the rectifiers. Loads above the rated capacity of the charger will take current from the battery and lower its terminal voltage, but the battery will be recharged to the desired nominal voltage as soon as the load is decreased to a value within the capacity of the charger. Under one half load conditions the current flowing in the D. C. windings of each of the reactors 10 and 13 through 16 is approximately midway between its minimum and maximum values when the impedance of the A. C. windings of the control device 11 is approximately midway between its minimum and maximum values. If the output voltage varies, due to variations in input voltage, load current, etc., the net magnetic flux flowing in the inner legs of the control device varies accordingly, thereby affecting the impedance of the A. C. windings on these legs in the proper sense to vary the impedance of the regulating reactor 10 in a direction which will cause the voltage impressed on transformer 7 to either increase or decrease sufficiently to compensate for the initial variation.

The alternating current supply for the reactance amplified may, if desired, be obtained directly from the input terminals of the charger and might include an A. C. voltage regulator. However, it has been found that improved regulation is obtained when the reactance amplifier is supplied from the transformer 6 due to the fact that the voltage impressed on this transformer increases with increased load thereby providing increased gain in the reactance amplifier for increased loads. A greater variation in the impedance of the regulating reactor 10, for a given variation in load, is thus obtained.

While a particular embodiment of the invention has been illustrated it is to be understood that numerous modifications may be incorporated therein without departing from the true spirit and scope of the invention as defined in the appended claims.

What is claimed is:

1. In a voltage regulating system, a source of alternating current, a direct current load circuit, a rectifier connected between said source and said load circuit, a regulating reactor having a saturating winding, a negative feedback winding and a variable impedance winding, a circuit connecting said variable impedance winding between said source and said rectifier to control the voltage impressed thereon, a magnetic amplifier having its input circuit connected across said load and having its output circuit connected to the saturating winding on said regulating reactor so as to govern the impedance winding thereon in accordance with deviations in the load circuit voltage from a nominal voltage, thereby tending to maintain the load circuit voltage constant, and a circuit connecting said negative feedback winding to said magnetic amplifier to suppress oscillations in the load circuit current to provide improved stability in the regulating system.

2. In a voltage regulating system, a source of alternating current, a direct current load circuit, a rectifier connected between said source and said load circuit, a regulating reactor having a saturating winding, an alternating current feedback winding, and a variable impedance winding, a circuit connecting said variable impedance winding between said source and said rectifier to control the voltage impressed thereon, a magnetic amplifier having its input circuit across said load and having its output circuit connected to the saturating winding on said regulating reactor so as to govern the impedance of the impedance winding thereon in accordance with deviations in a load circuit voltage from a nominal value, thereby tending to maintain the load circuit voltage constant, and a circuit connecting said alternating current feedback winding to said saturable reactance amplifier to increase the gain of said amplifier to provide improved regulation of the load circuit voltage.

3. In a voltage regulating system, a source of alternating current, a direct current load circuit, a rectifier connected between said source and said load circuit, a regulating reactor having a saturating winding, a feedback winding and a variable impedance winding, a circuit connecting said variable impedance winding between said source and said rectifier to control the voltage impressed thereon, a magnetic amplifier including therein a saturating winding, and having its input circuit connected across said load and having its output circuit connected to the saturating winding on said regulating reactor so as to govern the impedance of the impedance winding thereon in accordance with deviations in the load circuit voltage from a nominal value, thereby tending to maintain the load circuit voltage constant, and a circuit serially connecting said feedback winding to the saturating winding of said magnetic amplifier directly controlling the current flow in said saturating winding to suppress oscillations in the load circuit current to provide improved stability in the regulating system.

4. In a voltage regulating system, a source of alternating current, a direct current load circuit, a rectifier connected between said source and said load circuit, a regulating reactor having a saturating winding, an alternating current feedback winding and a variable impedance winding, a circuit connecting said variable impedance winding between said source and said rectifier to control the voltage impressed thereon, a magnetic amplifier including therein a saturating winding and having its input circuit connected across said load and having its output circuit connected to the saturating winding on said regulating reactor so as to govern the impedance of the impedance winding thereon in accordance with deviations in the load circuit voltage from a nominal value, thereby tending to maintain the load circuit voltage constant, and a circuit serially connecting said alternating current feedback winding to the saturating winding of said magnetic amplifier to increase the gain of said amplifier to provide improved regulation of the load circuit voltage.

5. In a voltage regulating system, a source of alternating current, a direct current load circuit, a rectifier connected between said source and said load circuit, a regulating reactor having a control winding, a feedback winding, and having a variable impedance winding connected between said source and said rectifier to control the voltage impressed thereon, a magnetic amplifier having its input circuit connected to said load circuit, having its output circuit connected to the control winding so as to govern the impedance of the variable impedance winding thereon in accordance with the load, thereby tending to maintain the load circuit voltage constant, a saturating winding in said amplifier serially connected to said feedback winding and controlling the current flow therein to provide improved stability and regulation, and means for energizing said amplifier with alternating potential which varies in accordance with the load, thereby providing further improved regulation of the load circuit voltage.

6. A balanced magnetic amplifier for use in a voltage regulating system comprising a source of alternating current, a plurality of saturable reactors, a plurality of linear reactors, a variable impedance winding on each of said first reactors connected across said source in series with the corresponding one of said second reactors, a plurality of bridge type rectifiers, a connection from a tap on said source to one A. C. terminal of each of said rectifiers, a connection from each junction between the first and second reactors to the other A. C. terminal of a corresponding one of said rectifiers, a saturating winding on each of said first reactors, connections between the saturating winding on each reactors, succeeding the first, and the D. C. terminals of the rectifier corresponding to the preceding saturable reactor, an input circuit connected to the saturating winding on the first saturable reactor, an output circuit connected to the D. C. terminals of the rectifier connected to the last saturable reactor, and a feedback winding linked with said output circuit and interconnecting one of said saturable connections and said D. C. terminals of said rectifier associated therewith for improving the gain of said amplifier.

7. A voltage regulating system including a load circuit, an impedance control circuit for regulating the load voltage of said load circuit, a control device, a magnetic amplifier interconnecting said control device and said impedance control circuit and responsive to variations in said control device to accordingly vary said impedance control circuit for regulating said load circuit, and an alternating current feedback winding linked with said impedance control circuit for controlling the operation of said magnetic amplifier to provide improved stability and regulation for said voltage regulating system.

8. In a voltage regulating system, a magnetic amplifier comprising a saturable reactor core and including thereon a saturating winding and a variable impedance winding, a direct current source for energizing said saturating winding, an alternating current means for energizing said variable impedance winding, said core providing means for varying the current flow in said variable impedance winding in response to variations of current in said saturating winding, an output circuit responsive to variations of current in said variable impedance winding, and an alternating current feedback winding linked with said output circuit and connected to said saturating winding to provide an increase of current flow through said amplifier.

9. In a voltage regulating system, a magnetic amplifier comprising a saturable reactor core and including thereon a saturating winding and a variable impedance winding, a direct current source for energizing said saturating winding, an alternating current means for energizing said variable impedance winding, said core providing means for varying the current flow in said variable impedance winding in response to variations in current in said saturating winding, an output circuit responsive to variations of current in said variable impedance winding, and an alternating current feedback winding linked with said output circuit and connected in series with said saturating winding and said direct current source to provide an increase of current flow through said amplifier.

10. In a voltage regulating system, a magnetic amplifier comprising a plurality of saturable core devices connected in cascade, each having a saturating winding and an output winding, a source of control current connected to the saturating winding of the first of said devices, means for energizing said output windings, a circuit including rectifying means interconnecting the output winding of each of said devices with the saturating winding of the next successive device, a regulating unit having a saturable core and the saturation thereof controlled by the output winding of the last of said devices, a first winding on said saturable core included within said regulating unit, and a feedback winding having a current induced therein controlled by said saturable core included within said regulating unit and connected to the saturating winding of one of said devices for providing an increase of current flow through said first winding included within said regulating unit.

11. In a voltage regulating system, a magnetic amplifier comprising a plurality of saturable core devices connected in cascade, each having a saturating winding and an output winding, a source of control current connected to the saturating winding of the first of said devices, means for energizing said output windings, a circuit including rectifying means interconnecting the output winding of each of said devices with the saturating winding of the next successive device, a regulating unit having a saturable core and the saturation thereof controlled by the output winding of the last of said devices, and an alternating current feedback winding on said core within said regulating unit having the alternating current flow therein controlled by the saturation of said core within said regulating unit and connected to the saturating winding of one of said devices for providing improved stabilization of said amplifier.

OTHO W. GRANDSTAFF.

REFERENCES CITED

The following references are of record in the file of this patent:

UNITED STATES PATENTS

| Number | Name | Date |
|---|---|---|
| 2,114,827 | Aggers | Apr. 19, 1938 |
| 2,306,998 | Claesson | Dec. 29, 1942 |
| 2,464,551 | Bockman | Mar. 15, 1949 |
| 2,560,284 | Grandstaff | July 10, 1951 |
| 2,561,329 | Ahlen | July 24, 1951 |